United States Patent [19]

Williams

[11] Patent Number: 4,468,883
[45] Date of Patent: Sep. 4, 1984

[54] MOUSE TRAP

[75] Inventor: Charles G. D. Williams, Rolling Hills Estates, Calif.

[73] Assignee: Environmentally Safe Products, Corp., Torrance, Calif.

[21] Appl. No.: 369,472

[22] Filed: Apr. 19, 1982

[51] Int. Cl.³ .............................................. A01M 23/18
[52] U.S. Cl. ........................................... 43/61; 43/67; 222/209
[58] Field of Search .................... 43/61, 65, 67, 60, 66, 43/97, 58, 124, 64; 222/209, 206, 213

[56] References Cited

U.S. PATENT DOCUMENTS

| | | | |
|---|---|---|---|
| 1,406,091 | 2/1922 | Schuirmann | 43/67 |
| 2,228,435 | 1/1941 | Binon | 222/209 |
| 2,454,476 | 11/1948 | Price | 43/60 |
| 3,143,755 | 8/1964 | Rowley | 222/206 |
| 3,256,894 | 6/1966 | Sherman | 222/206 |
| 3,624,951 | 12/1971 | Gilbaugh | 43/61 |
| 3,688,432 | 9/1972 | Fruits | 43/61 |
| 3,984,936 | 10/1976 | Camp | 43/66 |

Primary Examiner—Gene P. Crosby
Attorney, Agent, or Firm—Knobbe, Martens, Olson & Bear

[57] ABSTRACT

The trap has a ring shaped passage with a door which, when opened, extends into the passage so that a mouse can only enter the passage in one direction. A bait trail in the passage extends around to the back side of the door where it can be pushed closed by a mouse, or released by the mouse and closed by a spring. Magnetic or spring means are disclosed for holding the door in the closed position. An attractant dispenser is provided for dispensing fresh attractant near the back side of the door when the trap is to be used.

37 Claims, 18 Drawing Figures

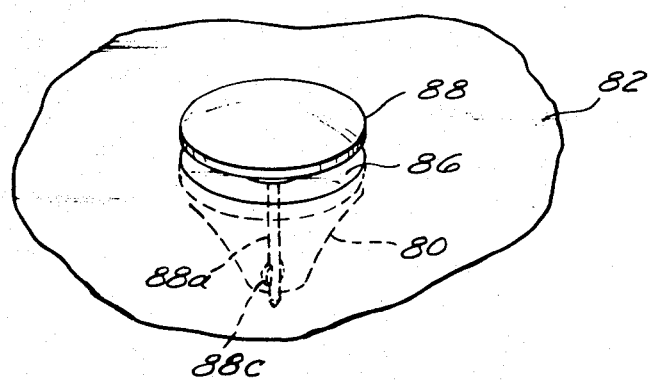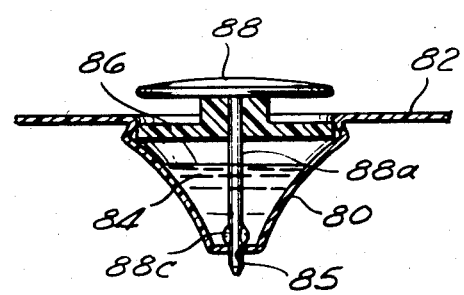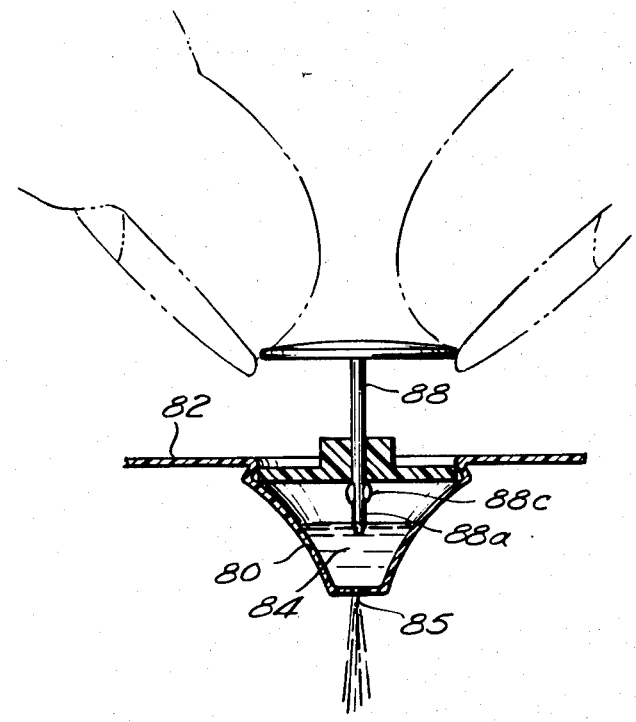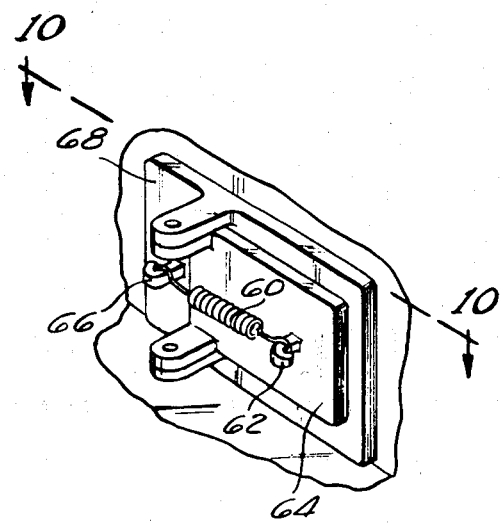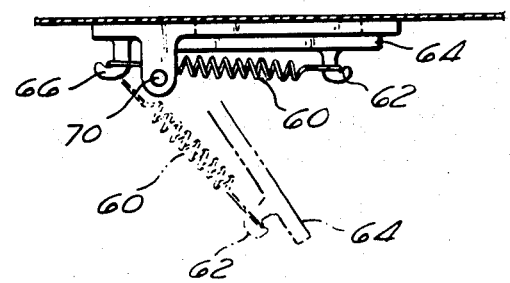

MOUSE TRAP

BACKGROUND OF THE INVENTION

Although a tremendous variety of mouse traps have been devised, there are disadvantages with all types and a need still exists for improvements. Such traps should be reliable, easy and inoffensive to use, safe with respect to household pets and children, and yet be relatively inexpensive.

The well-known spring trap which strikes and holds a mouse is inconvenient and somewhat difficult and dangerous to load. It is dangerous with respect to pets and children. It is an offensive task to handle and empty the trap.

Another type of trap employs mouse actuated trigger arrangements for capturing a mouse within a container. While this is a desirable approach, many of the trigger mechanisms are too complicated, and the traps are often sufficiently expensive that it is impractical to dispose of them, and emptying the trap is an offensive task.

Another method of trapping mice is by the use of sticky or gooey substances which hold the mouse captive until it dies of starvation. This approach is obviously messy and offensive.

SUMMARY OF THE INVENTION

The present invention satisfies the goals expressed above and avoids the disadvantages of earlier devices. Briefly stated, the trap of the invention includes walls which define a continuous loop path or passage, preferably in a compact ring shape. A door in a wall of the passage is moved into the passage in an open position when the trap is to be used, this allows the mouse to enter the passage, but the door blocks the passage in one direction so that the mouse is guided in the other direction. The mouse is attracted either by curiosity, bait or other attractant which is located behind the door in its open position so that the mouse is enticed fully into the trap. The mouse will push the door closed with its nose thereby being trapped within the passage, or the mouse will release the door and allow it to be closed by a spring.

Preferably, the walls forming the passage and the structure forming the door are air-tight so that the mouse will suffocate within a short time. Consistent with this, the cross-section of the passage is preferably made just large enough to accommodate the mouse's body, but small enough to make it difficult or impossible for the mouse to turn around. However, it can continue to move around the closed loop path. This exertion hastens death. An air-tight seal around the door is obtained by the use of a viscous sealant or by a magnetic membrane.

The door is provided with means for holding it in a closed position once it has been closed. In one arrangement, the door is hinged to a door frame, and a magnet is mounted on the door frame in position to attract a metal hinge structure on the door and hold the door closed. The door frame is slightly angled so that the door will remain in an open position by gravity. Thus, other means are not required for holding the door open with the magnetic arrangement. In an alternative door latching approach, an "over-center" spring arrangement is employed wherein the door is initially held in an open position by the spring, but when pushed slightly in the closed position will cause the line of force produced by the spring to shift so that the door is drawn to a closed position by the spring. In another form, the door is continuously urged closed by a spring but can be held open by a latch releasable by the mouse.

Various forms of bait may be provided with the trap to form an attracting trail to guide the mouse into the trap passage. In a preferred form of the invention, a fluid dispenser is positioned in a wall of the trap adjacent the inside of the door with the door in its open position. The dispenser contains a small quantity of fluid which is attractive to a mouse and which will remain relatively fresh for an extended period of time. Thus when the trap is to be used, it is only necessary to dispense a quantity of the fluid into the passage adjacent the back side of the open door. Consequently when the mouse approaches the door it is attracted by the smell of the material, but cannot get at the material without entering the passage and traveling around to the back side of the door, and in attempting to eat or smell the attractant will push the door into its closed position.

One of the important features of the invention is that the trap has been cleverly designed for low cost fabrication, such that it is practical to dispose of the trap with the mouse, thereby avoiding the disagreeable task of removing the mouse from the trap. One of the features contributing to the low manufacturing cost is that the trap passage is preferably made by vacuum forming a thin sheet of plastic into somewhat of a ring shaped shell which is open on one axial face. This face is closed by sealing the plastic member to a flat card. The door assembly is preferably made as a separate unit which is made with precision to ensure an air-tight closure. Preferably the attractant dispenser is simply made by two small, shallow, cup-like, flexible elements that are clamped together by a ring and mounted in a recess in the upper wall of the passage. A self-sealing hole in the inner dispenser wall enables the attractant to be dispensed into the passage simply by depressing the top wall of the dispenser to squeeze the substance out of the dispenser. In an alternative form of dispenser, a thumb tack-like valve element is manually raised to allow fluid to drip by gravity from a small chamber containing a quantity of the fluid attractant.

DESCRIPTION OF THE DRAWINGS

FIG. 9 is a perspective view of an alternative door assembly viewed from the inside of the trap;

FIG. 10 is a cross-sectional view of the door of FIG. 9 on line 10—10 showing the door in its open, phantom-line position;

FIG. 11 is a perspective view of an alternative form of attractant dispenser;

FIG. 12 is a cross-sectional view of the dispenser of FIG. 11 with the dispenser valve closed;

FIG. 13 is a cross-sectional view of the dispenser of FIG. 11 with the dispenser valve open;

DETAILED DESCRIPTION OF A PREFERRED EMBODIMENT OF THE INVENTION

Figure 1:
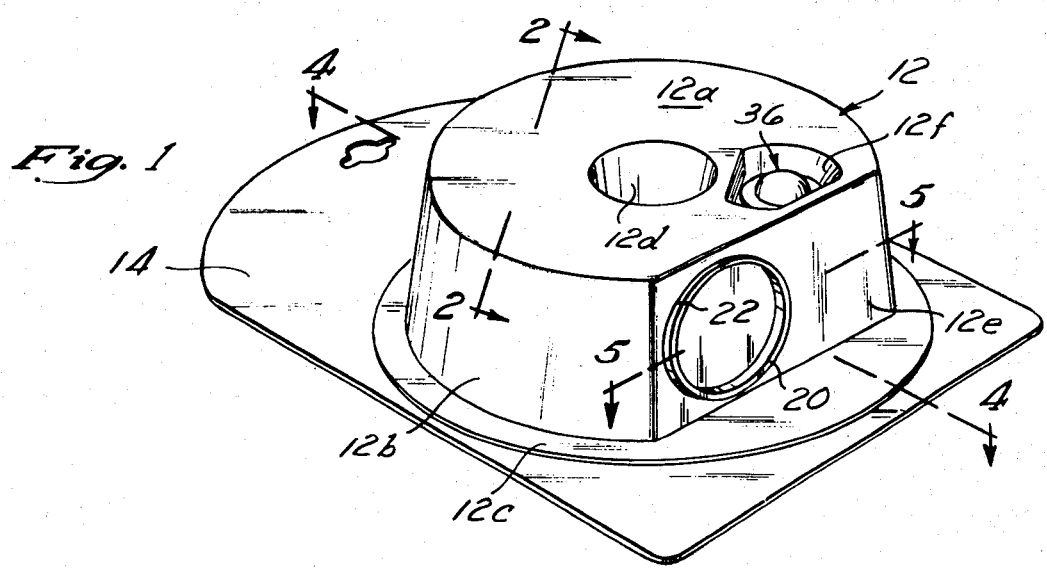
FIG. 1 is a perspective view of the trap of this invention with the entrance door in its closed position.
Figure 2:
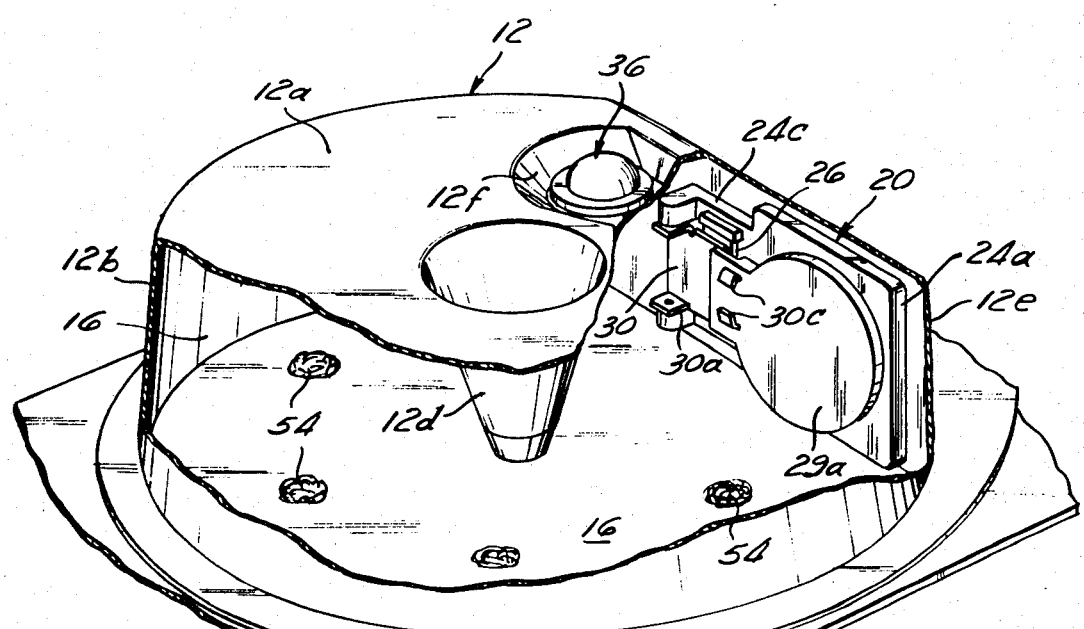
FIG. 2 is an enlarged perspective view of the trap along line 2—2 of FIG. 1 with the exterior passage walls being partially cut-away to illustrate the inside of the door assembly and the passage within the trap.

Referring first to FIGS. 1 and 2, the main body of the trap may be seen to include an upper housing or shell 12 positioned on a flat card 14. The shell 12 is preferably vacuum formed from a thin sheet of plastic into the generally ring shaped structure illustrated having an upper wall 12a, a generally annular shaped outer side wall 12b, an outwardly extending horizontal flange 12c attached to the lower edge of the outer side wall 12b, and an inner, downwardly extending projection 12d forming an inner annular wall. The outer flange 12c is suitably attached in an air-tight manner to the card 14 so that the shell 12 in combination with the card forms a continuous loop passage 16 for receiving a mouse.

One portion 12e of the outer shell wall 12b is formed relatively flat so as to better cooperate with a door assembly 20 attached to the inside of the flat wall to close an entry hole 22 in the flat wall portion 12e.

Figure 3:
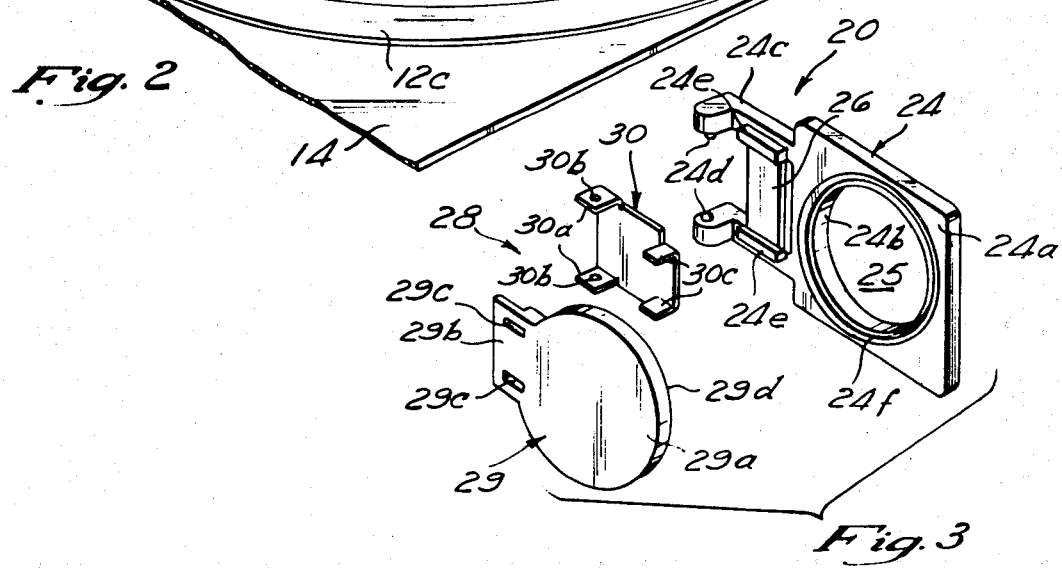
FIG. 3 is an exploded perspective view of the door assembly.

Referring to FIG. 3 as well as to FIG. 2, it may be seen that the door assembly 20 includes a frame 24 having a portion 24a that surrounds the entry 22 in the wall 12e and includes a ring section 24b that extends into the wall entry hole 22 and defines an opening 25. The frame further includes a hinge portion 24c having a pair of stub hinge pins 24d. A small flat permanent magnet 26 is secured to the frame 24 by a pair of lugs 24e, with the magnet being positioned between the hinge pins and the frame portion 24a. The door assembly 20 further includes a two-piece door 28 having a generally flat cover portion 29 and a hinge portion 30. The cover portion 29 has a circular section 29a which covers the opening 25 in the door frame portion 24a. Formed integral with one edge of the section 29a is a support section 29b having a pair of spaced, horizontally, extending slots 29c. The door hinge portion 30 includes a pair of spaced lugs 30a having openings 30b for receiving the door frame hinge pins 24d. The door hinge portion 30 further includes a pair of spaced tabs 30c that extend through the slots 29c formed on support section 29b of the door cover portion 29. These tabs 30c are bent inwardly as shown in FIG. 2 to secure the door hinge portion 30 to the cover portion 29.

Figure 6:
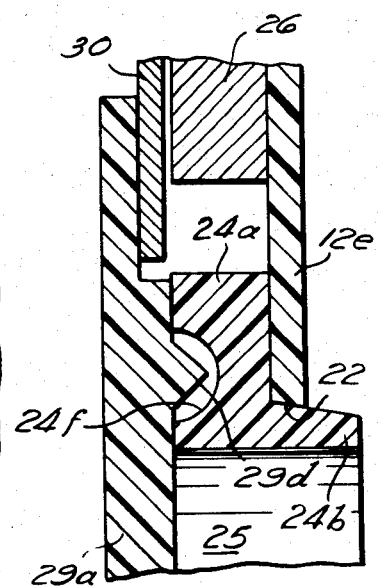
FIG. 6 is an enlarged cross-sectional view showing the sealing arrangement of the door assembly in the area outlined by line 6 in FIG. 5.
Figure 5:
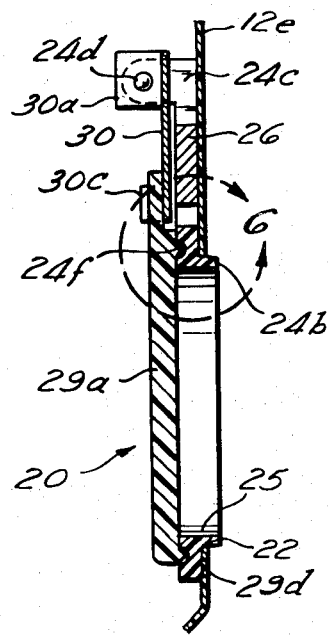
FIG. 5 is a cross-sectional view of the closed door assembly as shown along the line 5—5 of FIG. 1.

As mentioned above, it is desirable that the door 28 form an air-tight seal with the door frame 24. For this purpose, the door 28, is formed on its outwardly facing surface with an annular bead or rib 29d that fits within an annular recess 24f surrounding the door frame opening, as may be seen from FIGS. 5 and 6. The recess is preferably filled with a viscous substance that will cooperate with the door rib 29d to form a seal.

The door cover portion 29 and the door frame 24 are preferably formed by injection molding to provide the necessary precision, and they are formed of sufficient thickness to be rigid, in contrast to the thin, semi-rigid material used for the inexpensive, primary housing or shell 12. To further insure that an adequate seal is obtained while yet allowing for wide manufacturing tolerances in the door hinge mounting arrangement, the door hinge portion 30 and the door cover portion 29 are initially only loosely connected by inserting the tabs 30c of the hinge portion 30 into the slots 29c of the cover portion 29. The cover portion 29 is then positioned in proper sealing relation with the door frame 24 with the rib 29d in the recess 24f and with the hinge portion 30 properly positioned onto the door frame hinge pins 24d. With the parts thus properly positioned, the door hinge portion tabs 30c are bent 90 degrees by a suitable tool (not shown) to the position illustrated in FIG. 2, fixing the door portions 29 and 30 in proper relation. This method provides a precision fit with wide tolerances in a low cost manner. The door hinge portion is made of steel for strength and also to be attracted by the magnet 26 on the door frame 24.

Figure 4:
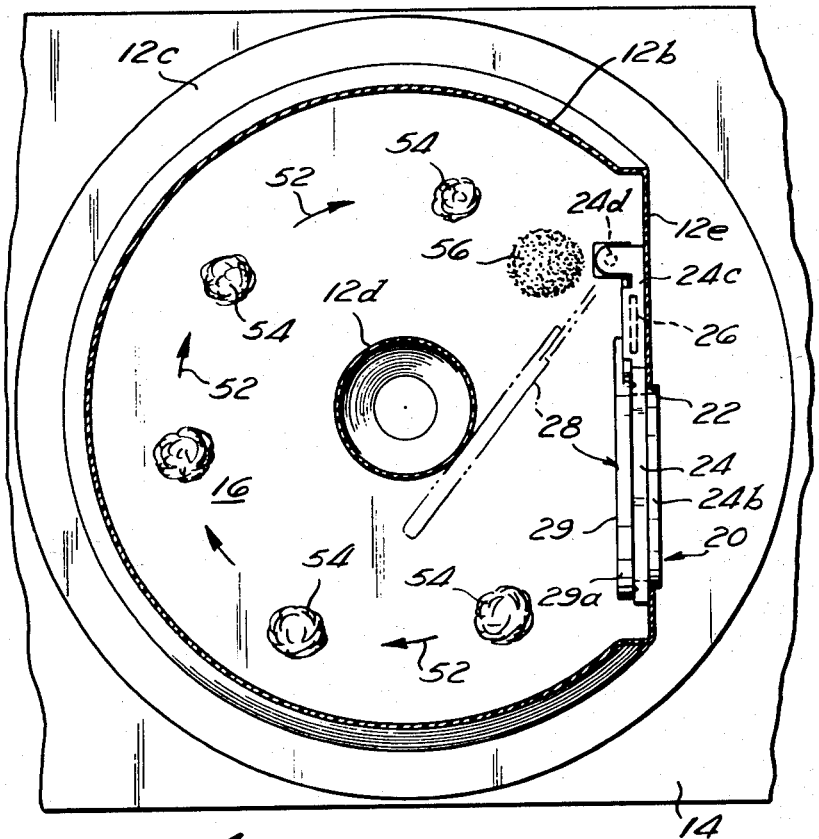
FIG. 4 is a cross-sectional view of the trap along the line 4—4 of FIG. 1, showing the trap door open in phantom-line use position.
Figure 7:
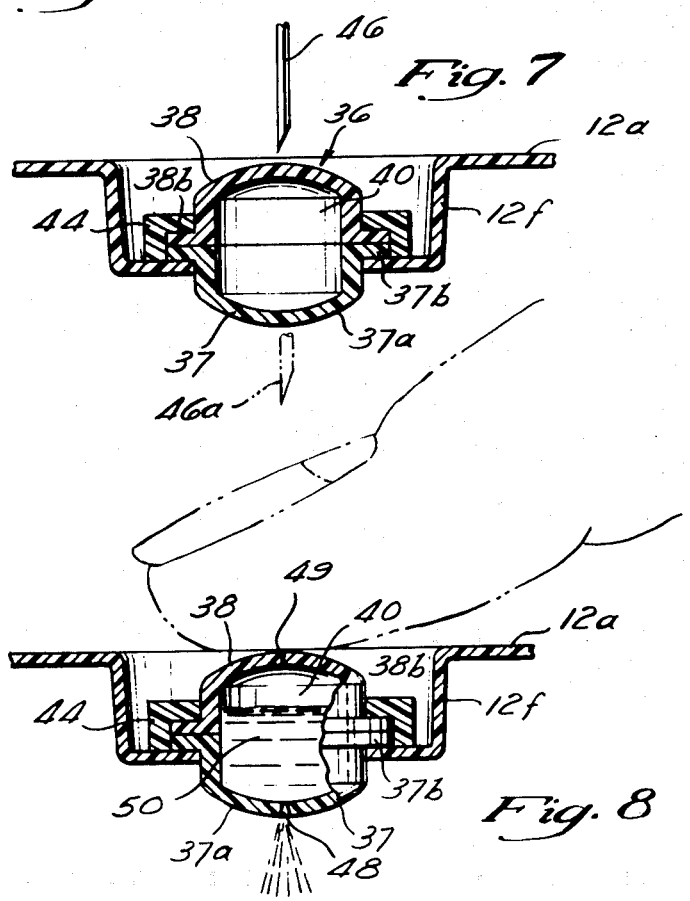
FIG. 7 is an enlarged cross-sectional view of the trap attractant dispenser, with such view also illustrating the manner in which the dispenser outlet is formed and the dispenser is filled.

As may be seen from FIG. 1 and FIG. 2, there is an attractant dispenser 36 positioned in a recess 12f in the upper wall of the main shell 12. This recess is located immediately adjacent to the door hinge and above and near the back side of the door 28 with the door in its open position as shown in FIG. 4. Referring to FIG. 7, the dispenser is very simply but cleverly designed, being formed of two shallow cup-like members 37 and 38 which are placed in face-to-face relation so as to define a chamber for holding the attractant. A cylindrical portion 37a of the lower member is sized to fit through a hole in the bottom of the recess in the upper wall 12a of the shell 12 as may be seen in FIG. 7, with an outwardly extending flange 37b on the lower member 37 engaging the bottom of the recess. The flange 38b on the upper member 38 engages the flange 37b on the lower member, and both flanges are confined by a retaining ring 44 which fits over the flanges and is attached to the bottom of the recess by sonic welding, adhesive, other suitable means.

Figure 8:
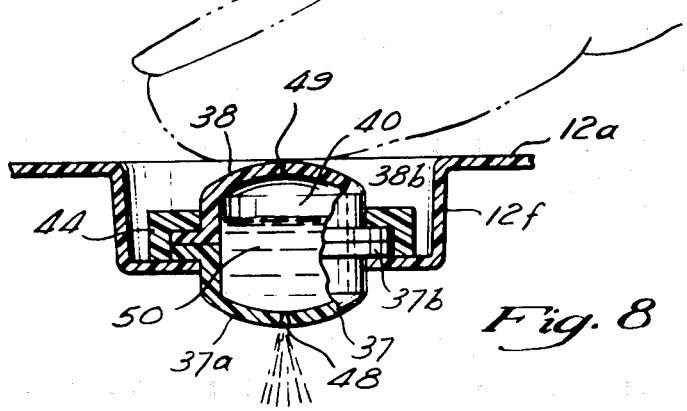
FIG. 8 is an enlarged cross-sectional view of the dispenser illustrating its manner of operation.

The dispenser cup-shaped members are formed of a resilient plastic or rubber material that is self-sealing with respect to small holes that may be formed in the material. This characteristic lends itself to a simplified method for forming an outlet in the dispenser while at the same time filling the chamber with the desired attractant. For this purpose, there is employed a syringe (not shown) having a small diameter needle 46. This needle, as illustrated in FIG. 7, is inserted downwardly through the end walls of each of the cup-shaped members 37 and 38 to the broken line position 46a illustrated in FIG. 7. The needle is then partially withdrawn to the point where the end of the needle is open to the chamber 40. A desired attractant is then injected into the chamber, following which the needle is withdrawn from the upper member 38 of the dispenser. Due to the resilient, self-sealing characteristics of the material, the attractant does not leak from the dispenser chamber through the holes formed by the needle. This is somewhat related to the attractant employed. It has been found that a suitable material is peanut oil, since it is attractive to mice and will retain a fresh smell over an extended period of time. The viscosity of the oil also helps to prevent leakage through the small holes 48 and 49 which were formed by the needle as shown in FIG. 8. When it is desired to dispense some of the attractant, it is only necessary to depress manually with one's finger the dispenser member 38, as illustrated in FIG. 8. This action reduces the volume of the chamber creating a pressure which forces some of the fluid 50 to be dispensed downwardly as illustrated in FIG. 8.

As an alternative approach for filling the dispenser chamber 40, the needle may be inserted only through the lower wall 37 and then withdrawn. Such needle should be provided with a vent tube to permit air to escape from the chamber 40 as an oil is injected.

Operation

The trap is normally purchased and stored in the condition illustrated in FIGS. 1, 2 and 4, wherein the door to the trap is closed. When it is desired to use the trap, it is only necessary for the user to push the door inwardly into the phantom line open position shown in FIG. 4, wherein a mouse can enter the passage within the trap but can only move in the direction indicated by the arrows 52, shown in FIG. 4. The door will remain in the open position since the wall in which the door frame is mounted is angled slightly outwards from the bottom so that the door will be kept open by gravity. More positive means may be provided to hold the door open if desired, but it is preferable to keep the device as simple and inexpensive as possible.

The trap is useful without bait or attractant in that a mouse being naturally curious may well enter the trap even without any other attractant. Nevertheless, a trail of bait 54 is attached to the floor of the trap by suitable edible adhesive as shown in FIG. 4; and to provide a fresh smell for attracting the mouse, the dispenser is depressed in positioning the trap so that a quantity of attractant 56 is sprayed onto an area of the floor immediately behind the back side or inside of the door as illustrated in FIG. 4.

When a mouse approaches the trap, it will be attracted by the bait on the floor of the trap immediately inside the door, and will also be attracted by the smell behind the door. Since the area behind the door cannot be directly reached because of the door blocking the path, the mouse is directed in the path indicated by the arrows. The cross-section of the path is sized such that it is just large enough to accommodate a mouse but it is sufficiently small that it is impossible or very difficult for the mouse to turn around. Of course, the mouse is enticed to go forward in any event in view of the bait and the fresh smell of the attractant 56. The length of the annular passage 16 within the path is sufficiently long that the mouse's entire body and its tail will be within the passage before the mouse's nose reaches the area 56 of fresh peanut oil behind the door 28. The annular passage is advantageous from the standpoint that a path of considerable length can be obtained with a compact package.

The mouse when investigating the attractant 56 will either deliberately or inadvertently push the door towards the closed position. The mouse does not necessarily have to push the door 28 completely closed because as the door starts to close, it is attracted by the magnet 26 on the door frame 24 which helps pull the door closed and keep it closed. An air-tight seal is formed by the door by way of the rib 20d on the door cooperating with the sealant in the recess 24f in the door frame 24, as explained above in connection with FIGS. 5 and 6. Since the plastic upper shell 12 and the lower card 14 are hermetically sealed, the trapped mouse will very quickly suffocate. If an air-tight seal is not obtained, the mouse is still trapped and will soon die because of dehydration.

When the user inspects the trap, it can be seen that the door is closed indicating that a mouse has been trapped. Also, the upper shell 12 of the trap is preferably made of a semi-opaque material such that it would be apparent whether a mouse was inside the trap, but yet it would not be totally visible. Although the material could be totally transparent, the semi-opaque approach is preferable for most people. Of course it would be apparent if a mouse carcass is in the the trap by lifting it an shaking it. If in any event a mouse is present, it is practical to discard the entire trap since it is inexpensive. The mouse can be removed and the trap reused if desired.

Alternative Arrangements

FIGS. 9 and 10 illustrate an alternative door assembly for the trap wherein a so-called "over-center" spring arrangement is employed. More specifically, a coil tension spring 60 extends between a hook 62 on the back side of a door 64 and a hook 66 on the back side of a door frame 68. The location of the attachment points for the spring are such that when the door is pivoted on its hinge to the open position shown in FIG. 9 by phantom lines, the door is positively held open by the spring 60 since the line of force along the centerline of the spring is on the side of the hinge axis 70 which holds the door open. The opening travel of the door is limited by the door engaging the inner passage wall of the trap, as shown in FIG. 4. When the mouse pushes the door slightly in a door closing direction, the spring attachment hook 62 on the door moves towards the door frame causing the center line of the spring force to cross over to the door closing side of the hinge axis 70 so that a force is produced positively pulling the door into closed position, as may be seen in FIG. 10. This arrangement works satisfactorily, but is slightly less desirable than the FIG. 3 arrangement because of the tendency of a mouse to gnaw at protrusions such as the hooks upon which the spring is attached. Also, from an assembly and reliability standpoint, the magnetic approach is deemed to be slightly preferable.

FIGS. 11, 12 and 13 illustrate an alternative form of a dispenser for the mouse attractant. A shallow conical wall 80 is formed in the upper wall 82 of a trap wall. The attractant 84 is inserted into this well and the upper opening of the well is closed by a cap 86 which fits within the upper end of the well 80. A thumb tack-like valve 88 extends through a central opening in the cap, and the lower end of the valve stem 88a extends through an outlet 85 in the lower end of the well, as seen in FIG. 12. To release attractant, it is only necessary to pull the valve stem upwardly, as illustrated in FIG. 13 by gripping the valve stem head. The diameter of the hole 85 in the bottom of the well is sufficiently large that the attractant will drip by gravity. Retainer projections 88c on the valve stem prevent the stem from being accidentally withdrawn. While this alternative approach is inexpensive, as is the arrangement described above, it is slightly less desirable in that it is believed that depressing an actuator is slightly more convenient than having to raise the valve stem.

It should be recognized that both forms of the attractant dispenser described are useful in other products as well as the particular mouse trap illustrated herein. Such arrangement may be useful in any trap or other apparatus in which it is desirable to dispense a fresh attractant material to entice any animal, rodent or pest. For example, it may be useful in a rodent feed station or a trap for flies or other insects. Similarly, the structure may be useful in totally unrelated devices in which it is desirable to have a low cost manually operated dispenser in a mass produced product.

Figure 14:
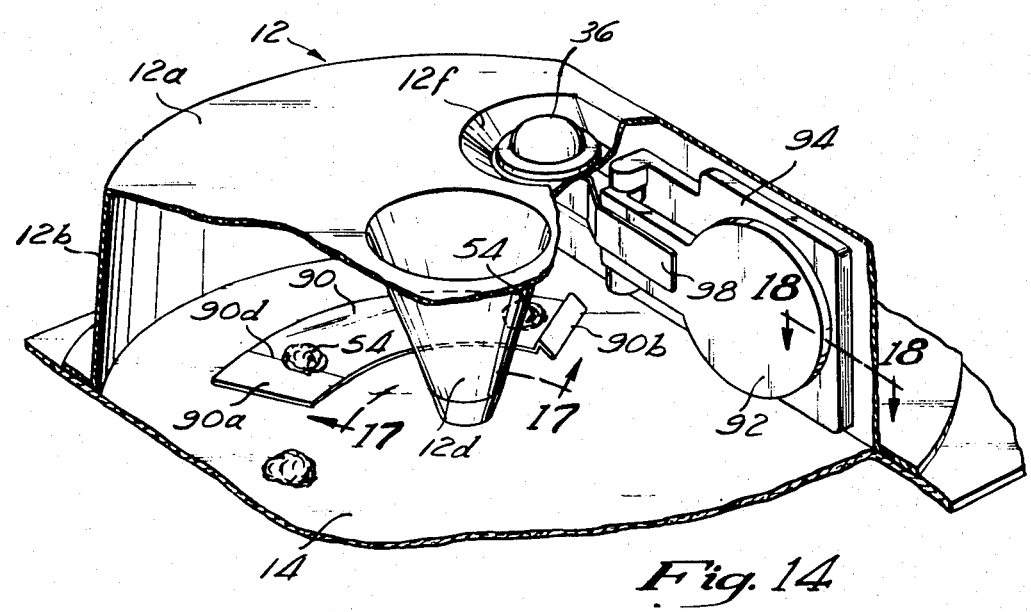
FIG. 14 is a perspective cut-away view of a trap similar to that shown in FIG. 2 but employing a spring loaded door, and a latch releasable by the mouse for holding the door in the open position.

FIGS. 14 through 18 illustrate another arrangement for holding a trap door open and for holding the door closed. Also included is an alternative door sealing arrangement. More specifically there is shown in FIG. 14 an elongated leaf spring 90 made of metal or plastic. One end 90a of the spring is attached by adhesive or other suitable means to the flat card 14 forming the bottom wall of the trap. A crease 90d is formed in the spring 90 adjacent the end 90a which causes the other end 90b of the spring to be elevated slightly from the bottom wall 14 in cantilever fashion. As may be seen from FIG. 17, the spring end 90b includes an upwardly extending latch portion 90c for holding the door 92 in open position.

Figure 15:
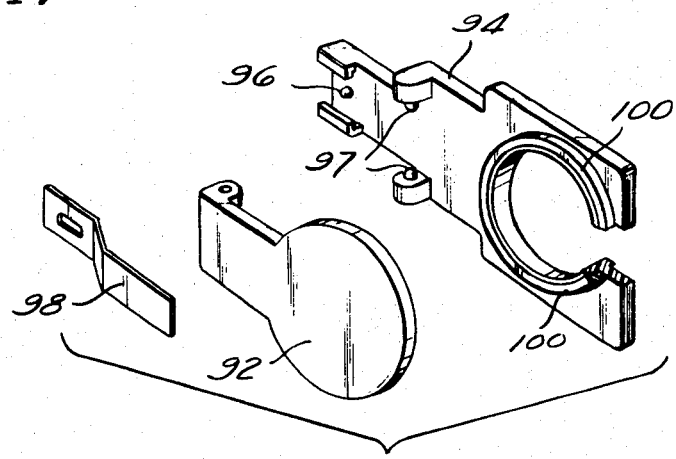
FIG. 15 is an exploded perspective view of the door assembly of the arrangement of FIG. 14.

Referring to FIG. 15, a door frame 94 is formed with a post 96 staked to the end of the door frame adjacent the hinge pins 97. A metal leaf spring 98 is mounted to the door frame 94 by means of a hold in one end of the spring 98 which fits over the post 96 on the door frame. The leaf spring 98 urges the door 92 into its closed position.

Figure 16:
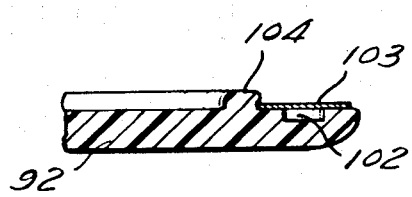
FIG. 16 is a fragmentary sectional view illustrating the magnetic seal for the door.

The door frame 94 includes a magnetic plastic ring 100 which is pressed or bonded around the inside of the opening in the door frame. Referring to FIG. 16, the door includes an annular groove 102, which is covered by a flat ring-shaped magnetic membrane 103 that is held in position by an annular bead or lug 104 formed on the door inwardly slightly from the annular groove. The membrane 103 is preferably formed of Mylar or some other such magnetic material. The membrane need only be about three to five thousandths of an inch thick.

Figure 17:
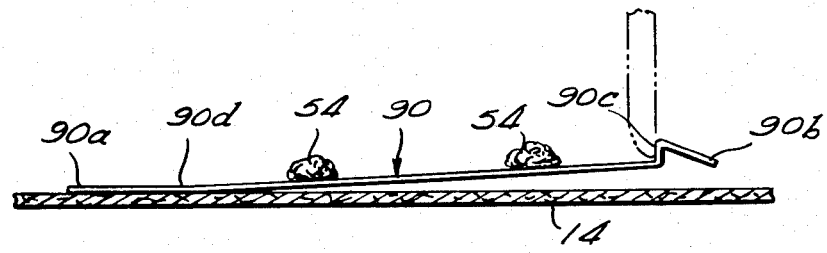
FIG. 17 is a cross-sectional, somewhat schematic view on lines 17—17 of FIG. 14, illustrating the door held in open position by the releasable latch.
Figure 18:
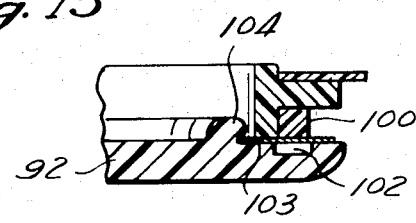
FIG. 18 is a cross-sectional view similar to FIG. 16 with the door closed.

In using the trap door arrangement of FIGS. 14–18, the door 92 is manually moved to the open position against the urging of the leaf spring 98. The door is held in this open position by the latch 90c on the leaf spring 90, as seen in FIG. 17. When a mouse enters the trap following a bait trail around to the back side of the open door, the mouse's weight on the leaf spring 90 will depress the latch 90c, releasing the door and enabling it to close in response to the urging of the door spring 98. The door opening is sealed by the thin membrane 103 engaging the magnetic ring 100 around the door frame 94 as shown in FIG. 18. The annular groove 102 in the door is aligned with the ring so that the membrane is free to make good magnetic contact with the magnetic ring to ensure an adequate seal.

I claim:

1. A mouse trap comprising:
   walls defining a continuous loop passage for receiving a mouse;
   an entry through which the mouse may enter the passage;
   a door for the entry; and
   means for mounting the door so that it is movable between an open position wherein the mouse may enter the passage, but the door blocks the passage in one direction so that the mouse is guided in the other direction into the passage, and a closed position wherein the entry is closed and the door no longer blocks the passage.

2. The trap of claim 1 wherein said door mounting means is constructed such that the door is movable towards the door closed position by a mouse pushing against the back side of the door as it extends across said passage.

3. The trap of claim 2 including means for holding the door in closed position comprising a magnet and a magnet keeper mounted on the door and structure adjacent said entry.

4. The trap of claim 1 wherein the passage is air-tight when the door is closed.

5. The trap of claim 1 or 4 including means for holding the door in a closed position.

6. The trap of claim 1 wherein said passage walls are formed by a loop-shaped member and a flat card with the loop-shaped member forming side walls and an upper wall of the passage and the card forming a bottom wall of the passage.

7. The trap of claim 6 wherein the loop-shaped member is made of a plastic sheet vacuum formed into the loop-shape with a central projection forming the inner walls of the loop.

8. The trap of claim 1 including a door frame mounted on said entry with said door hinged to said frame to swing between the open and closed positions.

9. The trap of claim 8 wherein said door and door frame includes seal means for preventing air flow between the door and the frame, and means for holding the door closed.

10. The trap of claim 9 wherein the seal means comprises a rib and mating recess surrounding the entry in the frame with a viscous sealant positioned in the recess.

11. The trap of claim 9 wherein the seal means includes a magnetic ring surrounding said entry and a ring-shaped element on the door which mates with the ring around the entry.

12. The trap of claims 8, 9, 10 or 11 wherein said door includes a cover portion to cooperate with said door frame to cover the opening in the door frame and a metal hinge portion which mounts the cover portion on the frame, said trap further includes a magnet carried by said frame cooperating with said door hinge portion to attract and hold the door closed.

13. The trap of claims 8, 9, 10 or 11 wherein said door includes a cover portion cooperating with said door frame to cover the opening in the door frame and a metal hinge portion which mounts the cover portion on the frame, said trap further including a magnet carried by said frame cooperating with said door hinge portion to attract and hold the door closed; said door portions including connecting means which permit the portions to be initially loosely connected to each other while the cover portion is properly mounted to said frame to cover the frame opening and the hinge portion is properly mounted to said frame, and then permit the portions to be firmly connected to each other while properly mounted to the frame.

14. The trap of claim 1 including mouse attractant located in the trap adjacent the inside of the door with the door in its open position to cause the mouse to push the door in a door closing direction.

15. The trap of claim 14 including a bait trail in said passage leading to the inside of the door in its open position.

16. The trap of claim 14 or 15 including means for dispensing a fluid mouse attractant into the area of the passage adjacent the inside of the door with the door in its open position.

17. The trap of claim 14 including means for dispensing a fluid mouse attractant into the area of the passage adjacent the inside of the door with the door is in its open position, said dispensing means comprising a small chamber mounted in the wall of the trap and having a flexible wall which may be manually pressed to squeeze attractant out of the chamber into said passage.

18. The trap of claim 17 wherein said chamber comprises a flexible shallow cup-like member closed by a second member to form a chamber, a small normally closed hole in one of the members facing into the passage whereby attractant may be dispensed from the dispenser by manually depressing the other member to force fluid out of the chamber through said hole.

19. The trap of claim 1 including means for holding the door in the open position and for holding the door in the closed position.

20. The trap of claim 19 wherein said holding means is a spring extending between the back side of the door and door frame and mounted such that the spring produces a door opening force in the open position of the door and a closing force in the door closed position.

21. The trap of claim 19 wherein said means for holding the door in open position comprises a releasable latch formed by one end of a flat spring, with the other end of the spring being secured to the bottom wall of the trap so that the latch is mounted in cantilever fashion permitting it to be depressed by the weight of the mouse to release the door.

22. The trap of claim 21 wherein said means for holding the door in closed position comprises a spring which also urges the door into closed position once released by the latch.

23. The trap of claim 1 wherein said door is mounted at an angle such that when moved to its open position, it will remain in open position by gravity.

24. The trap of claim 1 wherein the cross-section of the passage is large enough to permit a mouse to enter, and small enough to make it impossible or very difficult for the mouse to turn around in the passage.

25. The trap of claims 1 or 24 wherein the length of said passage is long enough to permit the mouse body and its entire tail to enter the passage before the mouse's nose reaches the inside of the door in its open position so that when the mouse pushes the door closed it is trapped in the passage.

26. A mouse trap comprising:
a flat card forming a bottom wall of a trap passage;
a plastic shell having an annular shape including an outer annular wall, an inner projection spaced inwardly from said outer wall and defining an inner annular wall, and an upper wall connected to said inner and outer wall, said shell being mounted on said card so that the shell wall in combination with the card form an annular passage for receiving a mouse;
an entry in said outer wall through which the mouse may enter the passage;
a door hingedly mounted to close the entry and be movable inwardly to an open position wherein the mouse may enter the passage but the door blocks the annular passage in one direction so that the mouse is guided in the other direction, said mouse being trapped in the passage when the door is closed, the cross-section of said passage being sufficiently large to receive a mouse but being sufficiently small that it is impossible or difficult for the mouse to turn around in the passage, the length of said passage being sufficiently long that the entire mouse and its tail will fit within the passage before the mouse's nose engages the back side of the door when the door is in the open position;
means for attracting the mouse into the passage around to the point where the mouse will engage the back side of the door and close the door; and
means for holding said door in its closed position.

27. A mouse trap comprising:
wall means defining an air-tight chamber for receiving a mouse;
a door assembly mounted in one of said walls to permit a mouse to enter the passage, said door assembly including a door frame attached to the wall and a door pivotally mounted on the frame and movable between open and closed positions to control access through an opening in the door frame, said door including a cover portion made of plastic which covers the opening in the door frame, said door and door frame including means for forming an air-tight seal between the door cover and the door frame, said door further including a metal hinge portion which is hingedly connected to hinge means on said door frame, said door hinge portion including means for an initial loose connection with said door cover which permits said door cover to be properly mounted on said door frame opening and permits said hinge portion to be adjustably mounted on said door frame with some freedom of movement with respect to the door cover portion, and said connecting means being deformable to more positively connect said door cover portion and said hinge portion after each portion has been adjusted properly with respect to the door frame, and means attached to said door frame to hold the door in closed position.

28. The trap of claim 27 wherein said door holding means includes a magnet mounted on said door frame for magnetically attracting the metal door hinge portion to hold the door closed.

29. A mouse trap having:
walls defining a passage for receiving a mouse;
a door for closing the passage to trap the mouse within the passage;
means responsive to the presence of the mouse in said trap for closing said door;
a dispenser for dispensing fluid into an area within said trap for attracting a mouse into the passage, said dispenser comprising a pair of shallow cup-shaped members having outwardly extending flanges on their open ends, said members being positioned with the flanges being in face-to-face contact with each other so that the members together form a chamber for receiving the mouse attractant, one of said cup members being positioned within a hole in one of said walls with its flange engaging the wall surface surrounding said hole; and
a retaining ring cooperating with said flanges and said one wall to hold the members together.

30. A device for attracting an animal comprising:

a wall defining a space into which the animal is to be attracted;

means defining a dispenser mounted in one of said walls for dispensing a quantity of material into said space which will entice the animal to enter the space;

wherein the dispenser comprises:

a pair of members cooperating together to form a chamber for confining the attractant; and zone of said members having a self-sealing outlet through which attractant may be sprayed into said space by depressing the other said members.

31. The device of claim 30 wherein:

said members each have a shallow cup-like shape with an outwardly extending flange on the open end of the cup shape;

said members being positioned with their flanges in engagement and their cup shapes open to each other to form said chamber;

a retaining ring cooperating with said flanges and said wall to hold the dispenser members together.

32. A device for attracting an animal comprising:

a wall defining a space into which the animal is to be attracted;

means defining a dispenser mounted in one of said walls for dispensing a quantity of material into said space which will entice the animal to enter the space; wherein said dispenser comprises:

a well in said one wall;

a cap on said well;

an outlet in said well; and a valve stem extending through said cap, through the chamber in said well, and through said outlet, the size of said outlet being such that fluid will drip from said well when the valve stem is withdrawn out of said outlet.

33. A method of trapping a mouse utilizing a container having walls defining a continuous loop passage and a door leading into said passage comprising:

moving the door into an open position in said chamber where a mouse can enter the passage but the door blocks the passage so that the mouse is guided in one direction in the passage and around through the passage to the inside of the door so that the door can close and the mouse will be trapped in the passage.

34. The method of claim 33 including positioning a mouse attractant in the passage to entice the mouse to travel completely into the passage and push against the door in a direction to close it.

35. The method of claim 33 including positioning a mouse attractant in the passage to entice the mouse to travel completely into the passage and release the door, allowing it to close.

36. A mouse trap comprising:

walls defining a passage for receiving a mouse;

an entry through which the mouse may enter the passage;

a door for the entry movable between a closed position and an open position, the back side of the door being accessible to the mouse when the door is in the open position;

a spring urging the door into its closed position; and a leaf spring having one end attached to a bottom wall of the passage and having its other end spaced from the bottom wall in cantilever fashion adjacent the door when the door is in its open position, latch means formed on said other spring end to hold the door in open position, said other end of the spring being depressable by the weight of a mouse so that the latch releases the door and allows it to close in response to the urging of the door closing spring.

37. The trap of claim 36 including a magnetic ring surrounding the entry and a thin magnetic membrane mounted on the door to mate with said ring and form a magnetic seal which prevents air passage through the door when it is closed.

* * * * *